Oct. 12, 1948.   H. ST. PIERRE   2,451,254
CHAIN LINK

Filed May 18, 1944   2 Sheets-Sheet 1

INVENTOR.
HENRY ST. PIERRE
BY

Oct. 12, 1948.  H. ST. PIERRE  2,451,254
CHAIN LINK
Filed May 18, 1944  2 Sheets-Sheet 2

INVENTOR.
HENRY ST PIERRE
BY

Patented Oct. 12, 1948

2,451,254

UNITED STATES PATENT OFFICE 2,451,254

CHAIN LINK

Henry St. Pierre, Worcester, Mass.

Application May 18, 1944, Serial No. 536,084

5 Claims. (Cl. 59—84)

This invention relates to improved chain joiner links and process of making the same.

Objects of the invention include the provision of a joiner link for a chain having alternate chain links and solid links and the scope of the invention also contemplates the provision of a modification thereof in which every link of the chain will be the same; the provision of a joiner link which is welded after assembly with solid links at a point between the center of the joiner link and one end thereof, i. e., at a point remote from the position of the stud in a stud link.

Other objects and advantages of the invention will appear hereinafter.

Reference is to be had to the accompanying drawings, in which

In this case the joiner link blank comprises a solid side 10, an end element 12, and an opposite end element 14. The end element 12 is formed to terminate short of the center of the link and the end element 14 conversely is formed to extend past the center of the link so that when the joiner blank is closed as illustrated in Fig. 2, the end surfaces 16 thereof will lie contiguously for welding of these ends.

Figure 3:
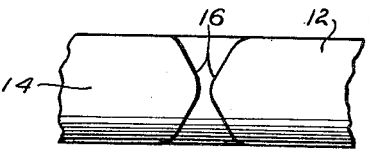
Fig. 3 is a detailed edge view of one shape that the ends of the joiner link may assume.
Figure 1:
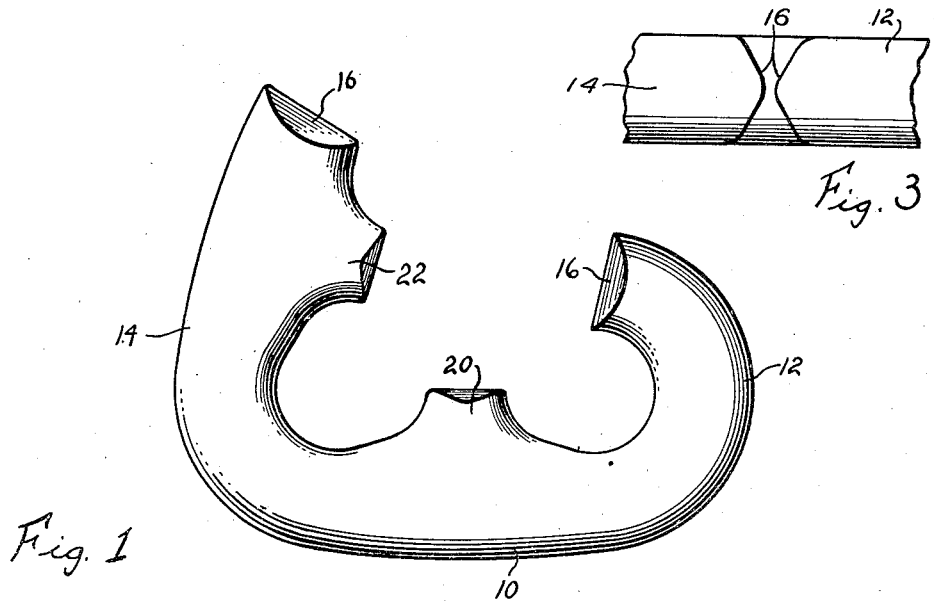
Fig. 1 is a view in elevation of a joiner link blank open for assembly.
Figure 2:
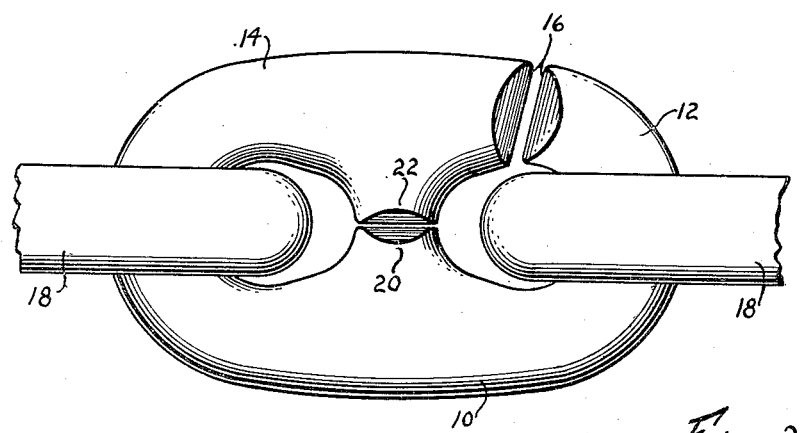
Fig. 2 is a view of the blank of Fig. 1 shown in assembled relation with solid links.
Figure 4:
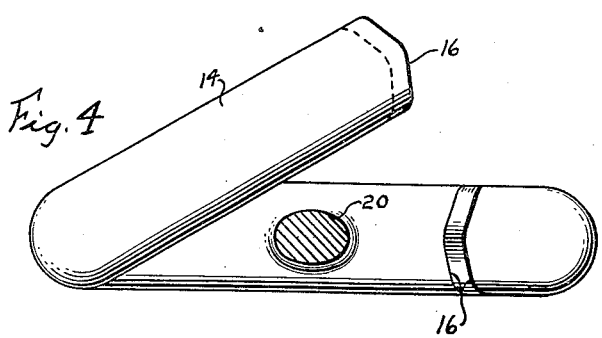
Fig. 4 is an edge view of a joiner link similar to that of Fig. 2 but opened in a different manner from that of Fig. 1.

The joiner blank illustrated may be originally forged in the condition shown in Fig. 2 or it may be forged as shown in Fig. 1. In the latter event it is only necessary to insert the two solid links 18 and to then bend end 14 down to the Fig. 2 position in order to assemble the chain. In the event that the joiner blank is forged as shown in Fig. 2, the longer end 14 must be bent to the Fig. 1 position prior to insertion of the solid links, or the end 14 may be twisted to the side as shown in Fig. 4 for the assembly step.

In any case the end faces 16 are adapted to be welded together in order to complete the chain after which the joiner blank may be coined, and reforged to desired shape in dies especially made for this purpose, normalized and heat treated.

If it is desired that the chain shall be composed of stud links, a partial stud 20 may be formed on the solid side 10 and a complementary stud part 22 may be formed on the link end element 14, these stud parts forming the stud after assembly as illustrated in Fig. 2. In some cases it is not necessary to weld the stud end parts together but if this is desirable it may be done in the same manner that the end faces 16 are welded by deposition of molten metal to be fused with the material of the link and also the reforging operation will form the stud to the desired shape.

Figure 5:
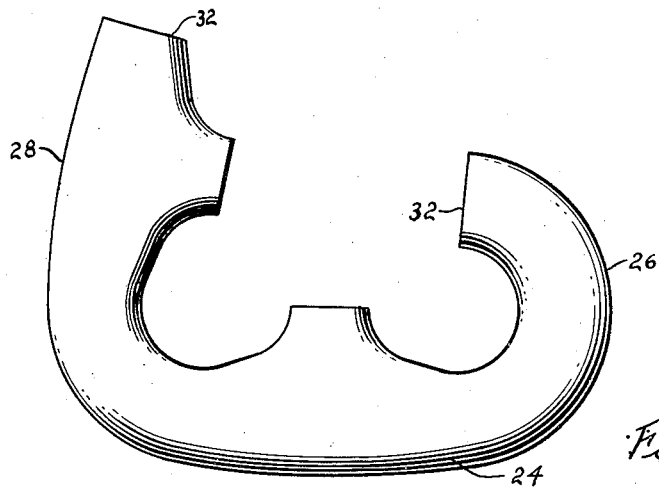
Fig. 5 illustrates a modified method.
Figure 6:
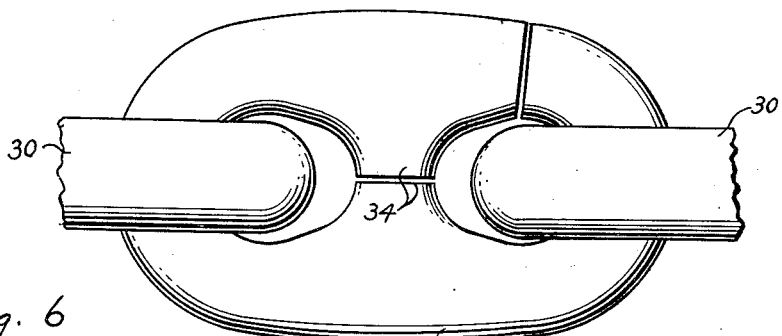
Fig. 6 is a view of the blank of Fig. 5 in assembled relation.

In Fig. 5 I have shown a blank similar to that shown in Fig. 1 and having a solid side 24, a short end 26 and a long end 28. As in the case of the above described joiner link, the link of Figs. 5 and 6 may be forged in the shape shown in Fig. 6 with consequent opening as shown in Fig. 5 or alternatively the twisting operation shown in Fig. 4 may be utilized. The solid links 30 are assembled in the same way and the ends 32 are welded together. The difference in construction over the joiner link above described is that the end faces 32 are cut after forging and the same is true of the ends 34 of the stud in case the stud is used. This construction provides particularly well for flash or butt welding rather than welding by the deposition of the extra metal and also it is even less necessary in this case to weld the stud parts together, since being cut they will align very satisfactorily; and inasmuch as the stress on any chain is a tension tending to force the stud parts together it will be rarely necessary to weld the stud parts. It is to be particularly noted that the long end element 28 may be opened from Fig. 6 position to the position of Fig. 5 or it may be twisted as in Fig. 4.

Figure 7:
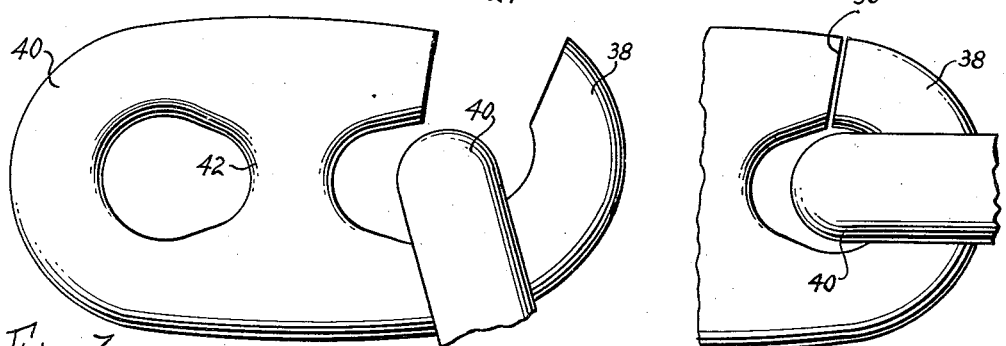
Fig. 7 is a view of a modified joiner blank illustrating its assembly with a link similar to itself.
Figure 8:
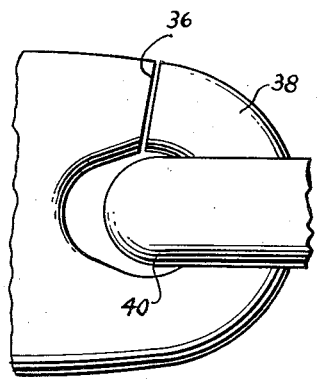
Fig. 8 is a view showing the link of Fig. 7 closed.
Figure 9:
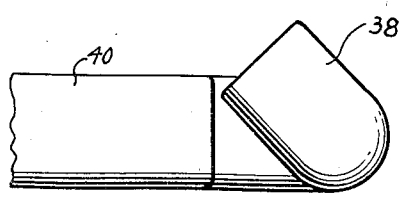
Fig. 9 illustrates a different method of opening the blank of Fig. 7.

In Figs. 7, 8 and 9 I have disclosed a link which requires but a single weld which will of course take place at 36 and this may be a butt or flash weld or a melted metal weld as desired. Also, this link may be forged as shown in Fig. 8 and then opened up as shown at 38 in Fig. 7, or the link may be forged as shown in Fig. 7 and then closed after assembly with the run in a similar link as shown at 40. Alternatively the end 38 may be twisted to the side for the assembly step as shown in Fig. 7.

In all cases the joiner link is welded and may be coined and reforged, normalized and heat treated. In the case of the modifications of Figs.

7, 8 and 9 the links are all exactly the same and the stud 42 is forged solid. In the other cases the stud is forged in parts or is cut and may or may not be welded as desired.

Having thus described my invention and the advantages thereof, I do not wish to be limited to the details herein disclosed, otherwise than as set forth in the claims, but what I claim is:

1. A one-piece chain link having a solid side and a single split in the other side, spaced plain ends defining the split side and being located adjacent an end of the link, and means forming a stud centrally of the link removed from the split.

2. A chain link having a solid side and a split side, spaced plain ends defining the split, the latter being removed from the center of the link adjacent an end thereof, and inwardly projecting means on the solid side and similar corresponding means adjacent one of said ends, said means together forming a stud.

3. A chain link having a solid side and a split side, spaced ends defining the split, the latter being located adjacent an end of the link, and a solid stud disposed centrally of the link and forming two eyes therein, said split appearing in one eye.

4. A chain link having a solid side, arms extending from the ends of the solid side toward each other, one arm being long and the other being shorter, and a solid stud connecting the longer arm and the solid side.

5. A chain connecting link comprising a solid side and a short curved end forming a part of an eye and a longer end opposite thereto forming a part of another eye, means on the solid side and the longer end to form a stud, the longer end extending at an angle to the solid side so as to enable the insertion of a solid link into either eye, the connecting link being capable of being completed by bending the longer end only toward the solid side.

HENRY ST. PIERRE.

REFERENCES CITED

The following references are of record in the file of this patent:

UNITED STATES PATENTS

| Number | Name | Date |
|---|---|---|
| 1,256,117 | Duncan | Feb. 12, 1918 |
| 1,256,118 | Duncan | Feb. 12, 1918 |
| 1,753,941 | Reid et al. | Apr. 18, 1930 |
| 1,938,056 | Taylor | Dec. 5, 1933 |
| 2,359,535 | Staats | Oct. 3, 1944 |